United States Patent
Orellana et al.

(10) Patent No.: US 12,141,942 B2
(45) Date of Patent: Nov. 12, 2024

(54) METHOD, ELECTRONIC DEVICE, AND COMPUTER PROGRAM PRODUCT FOR IMAGE PROCESSING

(71) Applicant: EMC IP Holding Company LLC, Hopkinton, MA (US)

(72) Inventors: Pedro Fernandez Orellana, Shanghai (CN); Qiang Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 432 days.

(21) Appl. No.: 17/400,382

(22) Filed: Aug. 12, 2021

(65) Prior Publication Data

US 2023/0024813 A1    Jan. 26, 2023

(30) Foreign Application Priority Data

Jul. 23, 2021 (CN) .......................... 202110841416.6

(51) Int. Cl.
  *G06T 3/4053* (2024.01)
  *A63F 13/525* (2014.01)
  (Continued)

(52) U.S. Cl.
  CPC .......... *G06T 3/4053* (2013.01); *A63F 13/525* (2014.09); *G06N 20/00* (2019.01); *G06T 3/4046* (2013.01); *G06T 3/4092* (2013.01)

(58) Field of Classification Search
  CPC ... G06T 3/4053; G06T 3/4046; G06T 3/4092; A63F 13/525; G06N 20/00
  See application file for complete search history.

(56) References Cited

U.S. PATENT DOCUMENTS 10,701,394 B1    6/2020   Caballero et al.
2013/0169863 A1  7/2013   Smith et al.
(Continued)

OTHER PUBLICATIONS

Zhang, A., Video Super-Resolution and Caching—An Edge-Assisted Adaptive Video Streaming Solution, Dec. 2021, IEEE Transactions on Broadcasting, vol. 67, No. 4, pp. 799-812 (Year: 2021).*

(Continued)

*Primary Examiner* — Vu Le
*Assistant Examiner* — Lei Zhao
(74) *Attorney, Agent, or Firm* — Ryan, Mason & Lewis, LLP (57) ABSTRACT

Embodiments of the present disclosure provide a method, an electronic device, and a program product for image processing. In one embodiment, a method may include: at an edge node of a network, obtaining a first image generated based on data associated with a target event, wherein the first image has a first resolution ratio. Additionally, the method may further include: sending a second image converted from the first image to a terminal device, wherein the second image has a second resolution ratio higher than the first resolution ratio. According to the embodiments of the present disclosure, by rendering a low-resolution-ratio image at a cloud server and transmitting the image to an edge node or a terminal device for reconstructing a high-resolution-ratio image, the bandwidth and time delay of high-definition image transmission can be significantly reduced, so that the user experience is improved.

20 Claims, 5 Drawing Sheets

(51) Int. Cl.
*G06N 20/00* (2019.01)
*G06T 3/4046* (2024.01)
*G06T 3/4092* (2024.01)

(56) References Cited

U.S. PATENT DOCUMENTS

| | | | |
|---|---|---|---|
| 2018/0139458 A1 | 5/2018 | Wang et al. | |
| 2019/0130530 A1 | 5/2019 | Schroers et al. | |
| 2020/0162789 A1 | 5/2020 | Ma et al. | |
| 2021/0006782 A1 | 1/2021 | Ramchandran et al. | |
| 2021/0176519 A1* | 6/2021 | Thapaliya | H04M 1/72454 |

OTHER PUBLICATIONS

Chen, H., Learned Resolution Scaling Powered Gaming-as-a-Service at Scale, IEEE Transactions on Multimedia, vol. 23, 2021 pp. 584-596 (Year: 2021).*

Chen, H., Learned Resolution Scaling Powered Gaming-as-a-Service at Scale, IEEE Transactions on Multimedia, vol. 23, 2021 pp. 584-596 (Year: 2021) (Year: 2021).*

Zhang, A., Video Super-Resolution and Caching—An Edge-Assisted Adaptive Video Streaming Solution, Dec. 2021, IEEE Transactions on Broadcasting, vol. 67, No. 4, pp. 799-812 (Year: 2021) (Year: 2021).*

Video Super-Resolution and Caching—An Edge-Assisted Adaptive Video Streaming Solution, Published in: IEEE Transactions on Broadcasting ( vol. 67 , Issue: 4, Dec. 2021), pp. 799-812, Date of Publication: Apr. 12, 2021, Publisher: IEEE, https://doi.org/10.1109/TBC.2021.3071010 (Year: 2021).*

U.S. Appl. No. 17/400,350 filed in the name of Qiang Chen et al. on Aug. 12, 2021, and entitled "Method, Electronic Device, and Computer Program Product for Video Processing.".

Wikipedia, "Google Stadia," https://en.wikipedia.org/wiki/Google_Stadia, Aug. 11, 2021, 15 pages.

Wikipedia, "Video Super Resolution," https://en.wikipedia.org/wiki/Video_Super_Resolution, Jun. 27, 2021, 18 pages.

Amazon Web Services, "AI Video Super Resolution," https://www.amazonaws.cn/en/solutions/ai-super-resolution-on-aws/, Feb. 2020, 6 pages.

Wikipedia, "GeForce Now," https://en.wikipedia.org/wiki/GeForce_Now, Jun. 6, 2021, 5 pages.

Wikipedia, "Xbox Cloud Gaming," https://en.wikipedia.org/wiki/Xbox_Cloud_Gaming, Aug. 9, 2021, 7 pages.

C. Faulkner, "Microsoft's xCloud game streaming is now widely available on iOS and PC," https://www.theverge.com/2021/6/28/22554267/microsoft-xcloud-game-streaming-xbox-pass-ios-iphone-ipad-pc, Jun. 28, 2021, 4 pages.

Wikipedia, "Nvidia Shield TV," https://en.wikipedia.org/wiki/Nvidia_Shield_TV, Jun. 24, 2021, 3 pages.

* cited by examiner

METHOD, ELECTRONIC DEVICE, AND COMPUTER PROGRAM PRODUCT FOR IMAGE PROCESSING

RELATED APPLICATION(S)

The present application claims priority to Chinese Patent Application No. 202110841416.6, filed Jul. 23, 2021, and entitled "Method, Electronic Device, and Computer Program Product for Image Processing," which is incorporated by reference herein in its entirety.

FIELD

Embodiments of the present disclosure relate to the field of image processing, and in particular, to a method, an electronic device, and a computer program product for image processing.

BACKGROUND

Encoding and transmission technologies for high-definition images and video streams have been developed rapidly in recent years, but a high-definition visual effect has not been achieved in cloud games. Cloud games are games played based on cloud computing. In an operation mode of cloud games, all games operate at a server side, and rendered game images are encoded and then transmitted to terminal devices of users through a network. The terminal devices of users do not need any high-end processors and video cards, and only need basic video decoding capability to show the game images to the users. When the game server is used to render high-definition images of the games, the time of data processing is significantly increased. Additionally, when the game server transmits the rendered high-definition images to terminal devices of users through the network, the transmission bandwidth and transmission time delay of the image data are significantly increased, thus worsening the game experience of users.

SUMMARY

Embodiments of the present disclosure provide a solution for image processing.

In a first aspect of the present disclosure, a method for image processing is provided. The method may include: at an edge node of a network, obtaining a first image generated based on data associated with a target event, wherein the first image has a first resolution ratio. Additionally, the method may further include: sending a second image converted from the first image to a terminal device, wherein the second image has a second resolution ratio higher than the first resolution ratio.

In a second aspect of the present disclosure, a method for image processing is provided. The method may include: at a terminal device, receiving a first image which is from an edge node of a network and generated based on data associated with a target event or a second image converted according to the first image, wherein the first image has a first resolution ratio, and the second image has a second resolution ratio higher than the first resolution ratio. Additionally, the method may further include: presenting the second image.

In a third aspect of the present disclosure, an electronic device is provided, including: a processor; and a memory coupled to the processor and having instructions stored therein, wherein the instructions, when executed by the processor, cause the electronic device to perform actions comprising: at an edge node of a network, obtaining a first image generated based on data associated with a target event, wherein the first image has a first resolution ratio; and sending a second image converted from the first image to a terminal device, wherein the second image has a second resolution ratio higher than the first resolution ratio.

In a fourth aspect of the present disclosure, an electronic device is provided, which includes a processor; and a memory coupled to the processor and having instructions stored therein, wherein the instructions, when executed by the processor, cause the electronic device to perform actions comprising: at a terminal device, receiving a first image which is from an edge node of a network and generated based on data associated with a target event or a second image converted according to the first image, wherein the first image has a first resolution ratio, and the second image has a second resolution ratio higher than the first resolution ratio; and presenting the second image.

In a fifth aspect of the present disclosure, a computer program product is provided. The computer program product is tangibly stored on a computer-readable medium and includes machine-executable instructions, wherein the machine-executable instructions, when executed, cause a machine to perform any steps of the method according to the first aspect or the second aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical or similar reference numerals generally represent identical or similar components in the example embodiments of the present disclosure. In the accompanying drawings.

DETAILED DESCRIPTION

Principles of the present disclosure will be described below with reference to several example embodiments shown in the accompanying drawings.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of additional embodiments." The terms "first," "second," and the like may refer to different or identical objects. Other explicit and implicit definitions may also be included below.

As mentioned above, in order to allow cloud game users to have an experience of games with high-definition image quality, a conventional game image processing and transmission scheme is as follows: game data is rendered into high-definition images or high-definition video streams by using a game engine disposed on a cloud server side, and the rendered high-definition images or high-definition video streams are transmitted to terminal devices of users via the Internet. The terminal devices decode data of the received high-definition images or high-definition video streams, so as to present the high-definition images or high-definition video streams to the users on output devices such as high-definition displays. Due to the problem of high bandwidth and large delay of game data transmission caused by the rendering process and transmission process of high-definition images, the conventional scheme is limited by the communication network and cannot effectively improve the user experience.

In view of this, the embodiments of the present disclosure provide a solution for image processing. In this solution, a developer may train an image processing model using a model training module on a cloud server side. The model training module is trained to be dedicated to reconstructing a low-resolution-ratio image into a high-definition image. After the image processing model has been trained, the cloud server side may load the image training model to a terminal device of a user or an edge node adjacent to the terminal device. Therefore, the game engine disposed on the cloud server side does not need to render high-definition images, but only needs to render low-resolution-ratio images and transmits the rendered images to the terminal device of the user or the edge node adjacent to the terminal device.

By implementing the above solution, the time of rendering game images by the game engine on the cloud server side can be shortened. Since the rendered images have a low resolution ratio, the data volume of images to be transmitted will also be low, so that the network bandwidth from the cloud server side to the terminal device or the edge node can be saved, and the time delay of data transmission can be reduced.

Figure 1:
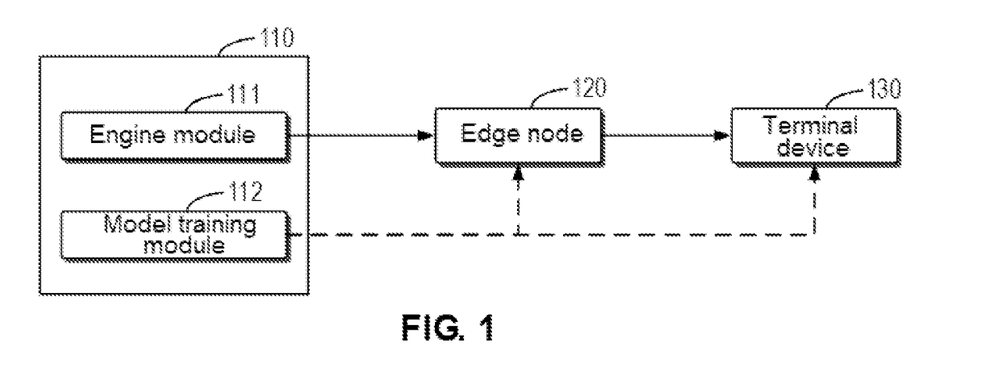
FIG. 1 illustrates a schematic diagram of an example environment in which multiple embodiments of the present disclosure can be implemented.

The embodiments of the present disclosure will be specifically described below with reference to the accompanying drawings. FIG. 1 illustrates a schematic diagram of example environment 100 in which multiple embodiments of the present disclosure can be implemented. As shown in FIG. 1, example environment 100 includes cloud server 110, edge node 120, and terminal device 130.

As shown in FIG. 1, different from conventional cloud game architectures, edge node 120 is disposed between cloud server 110 and terminal device 130. At least engine module 111 and model training module 112 are disposed in cloud server 110. Engine module 111 may be a game engine or a video player. In the present disclosure, the game engine is configured to render game images based on game data, and additionally, the game images may be low-resolution-ratio images. Further, cloud server 110 may transmit the rendered images to edge node 120. Additionally, model training module 112 is configured to train an image processing model by using a training dataset. The image processing model is configured to reconstruct low-resolution-ratio images into high-definition images. In some embodiments, cloud server 110 may transmit the trained image processing model to edge node 120 or terminal device 130.

Edge node 120 is a computing node located at the network edge and is generally disposed at terminal device 130 of a user, so as to reduce the bandwidth and time delay loss caused by network transmission and multi-stage forwarding. In some embodiments, when edge node 120 is loaded with the image processing model trained by cloud server 110, edge node 120 may convert low-resolution-ratio images received in real time from cloud server 110 into high-definition images by using the image processing model. Further, edge node 120 may transmit the converted high-definition images to terminal device 130 of the user.

Terminal device 130 is an interface device that can be directly operated by the user, it may be a computing device (GPU, CPU, etc.) with high graphics operation and processing capability, and it may also be a light-weight computing device only having the basic video decoding capability. In some embodiments, when terminal device 130 has high image operation and processing capability and is loaded with the image processing model trained by cloud server 110, terminal device 130 may convert low-resolution images rendered by cloud server 110 and forwarded in real time by edge node 120 into high-definition images by using the image processing model.

Therefore, terminal device 130 can present high-definition images to the user and ensures low bandwidth and low time delay.

It should be understood that the architecture and functions of example environment 100 are described for illustrative purposes only, without implying any limitation to the scope of the present disclosure. The embodiments of the present disclosure may also be applied to other environments having different structures and/or functions.

Figure 2:
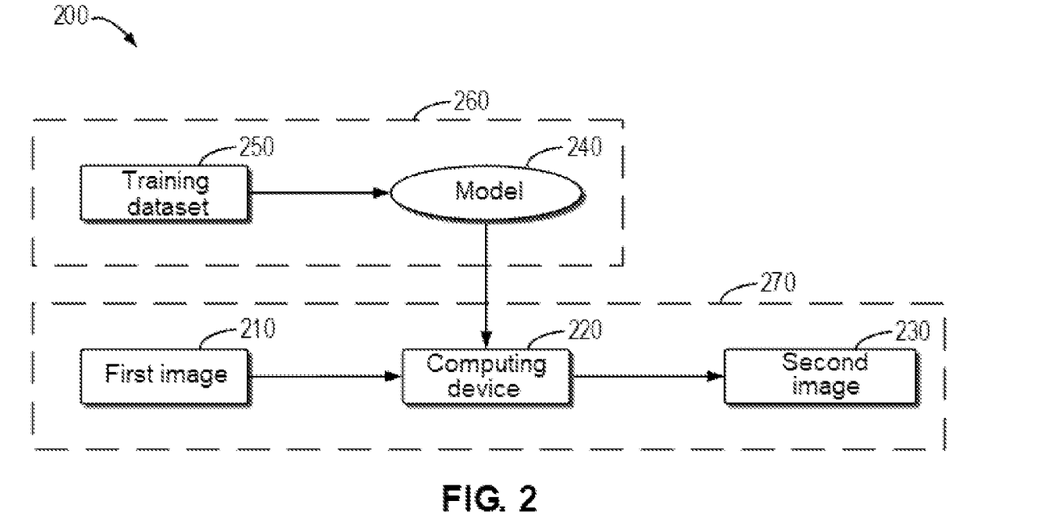
FIG. 2 illustrates a schematic diagram of a detailed example environment for training and applying a model according to embodiments of the present disclosure.

In order to describe a training process of the image processing model in detail, the training and application process of the model will be described with reference to FIG. 2. FIG. 2 illustrates a schematic diagram of detailed example environment 200 for training and applying a model according to embodiments of the present disclosure. As shown in FIG. 2, example environment 200 may generally include model training system 260 and model application system 270. As an example, model training system 260 and/or model application system 270 may be implemented in edge node 120 or terminal device 130 as shown in FIG. 1 or in computing device 220 as shown in FIG. 2. It should be understood that the structure and functions of example environment 200 are described for illustrative purposes only, and are not intended to limit the scope of the subject matter described herein. The subject matter described herein may be implemented in different structures and/or functions.

As mentioned above, all processes of reconstructing low-resolution-ratio images into high-definition images may be divided into two stages: a model training stage and a model application stage. As an example, at the model training stage, model training system 260 can use training dataset 250 to train model 240 configured to execute corresponding functions. It should be understood that training dataset 250 may be a combination of a plurality of pieces of reference data (as an input to model 240) and corresponding marked reference supervision information (as an output from model 240). As an example, an image with a resolution ratio of 540p may be used as reference data, and a corresponding image with a resolution ratio of 4K may be used as reference supervision information. At the model application stage, model application system 270 may receive trained model 240. For example, model 240 is an image processing model. Therefore, model 240 loaded into computing device 220 of model application system 270 can reconstruct second image 230 with a high resolution ratio based on any first image 210 with a low resolution ratio.

In other embodiments, model 240 may be constructed as a learning network. In some embodiments, the learning network may include a plurality of networks, and each of the networks may be a multilayer neural network that may consist of a large number of neurons. Through the training process, corresponding parameters of the neurons in each of the networks can be determined. Parameters of the neurons in these networks are collectively referred to as parameters of model 240.

The training process of model 240 may be implemented in an iteration mode until at least part of the parameters of model 240 converge or until a preset number of iterations is reached, thus obtaining final model parameters.

The technical solution described above is only used as an example, and does not limit the present invention. It should be understood that the networks may also be disposed according to other manners and connection relationships. In order to explain the principle of the above solution more clearly, the process of image processing will be described below in more detail on the edge node side and the terminal device side, respectively, with reference to FIG. 3 and FIG. 4.

Figure 3:
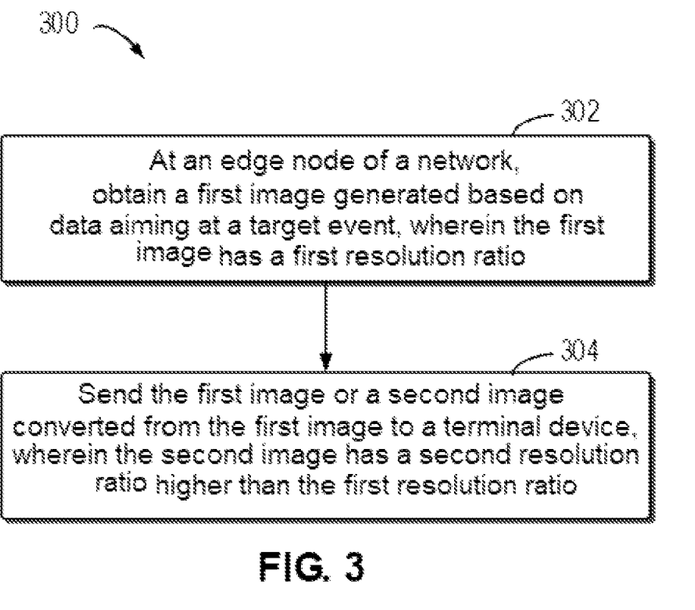
FIG. 3 illustrates a flow chart of a process for image processing on an edge node side according to embodiments of the present disclosure.

FIG. 3 illustrates a flow chart of process 300 for image processing on an edge node side according to embodiments of the present disclosure. In some embodiments, process 300 may be implemented in edge node 120 in FIG. 1. Process 300 for image processing according to the embodiments of the present disclosure will now be described with reference to FIG. 3 in combination with FIG. 1. For ease of understanding, specific examples mentioned in the following description are all illustrative and are not used to limit the protection scope of the present disclosure.

At 302, edge node 120 of a network can obtain a first image generated based on data associated with a target event. It should be understood that the target event may be an entertainment interaction event (such as games, particularly cloud games), an online education event (such as a remote classroom), and an online conference event. In some embodiments, the first image has a low first resolution ratio, for example, 540p, and the first image obtained by edge node 120 may be generated in engine module 111 of cloud server 110 through rendering based on game data. Optionally or additionally, the first image obtained by edge node 120 may also be rendered by the game engine disposed in edge node 120.

At 304, edge node 120 may send the first image or a second image converted from the first image to terminal device 130. The second image has a second resolution ratio higher than the first resolution ratio, for example, 4K. In such manner, the data volume of game data to be rendered and transmitted by the cloud server is reduced, thereby reducing the time delay for the game data to be transmitted to terminal device 130 of the user. Additionally, assuming by way of example that 1 G of bandwidth is needed for transmitting a conventional image directly rendered by cloud server 110 and having a first resolution ratio such as 4K, a substantially reduced amount of bandwidth, such as only 100 M of bandwidth, is needed for transmitting an image rendered by engine module 111 of cloud server 110 of the present disclosure and having a second resolution ratio such as 540p. Therefore, the bandwidth for image transmission is significantly reduced.

In some embodiments, the image processing model obtained through training by model training module 112 in cloud server 110 may be loaded to edge node 120. At this point, edge node 120 may convert a first image into a second image based on the trained image processing model. In some embodiments, the image processing model received from cloud server 110 in the network is trained based on training dataset 250. For example, model training module 112 uses low-resolution-ratio reference images as the input to the image processing model and uses corresponding high-resolution-ratio reference images as the output from the image processing model to iteratively train the image processing model until parameters of the image processing model converge or until a preset number of iterations is reached. By using such manner, cloud server 110 is used for training a model, and the edge node is used for realizing the reconstruction of high-resolution-ratio images by using the model. Therefore, the hardware requirements of the user for the terminal device can be reduced while reducing the bandwidth and time delay of transmission of high-definition images.

In some embodiments, if terminal device 130 is a computing device having sufficient graphics operation and processing capability, an image processing model obtained through training by model training module 112 in cloud server 110 can be loaded to terminal device 130. At this point, terminal device 130 can convert a received first image into a second image. In some embodiments, the image processing model received from cloud server 110 in the network is trained based on training dataset 250. For example, model training module 112 uses low-resolution-ratio reference images as the input to the image processing model and uses corresponding high-resolution-ratio reference images as the output from the image processing model to iteratively train the image processing model until parameters of the image processing model converge or until a preset number of iterations is reached. By using such manner, the bandwidth and time delay of transmission of high-definition images can be significantly reduced, so that the user experience is improved.

In some embodiments, the low-resolution-ratio reference images and corresponding high-resolution-ratio reference images used as training dataset 250 are obtained from at least one of the following: a frame in a video obtained from the server; an image rendered at the server; and an image received from the terminal device. As an example, the frame in the video obtained from the server may be a frame in a game video obtained from a video content platform such as YouTube. For example, a frame in a game video may be obtained, a low-resolution-ratio image of the frame can be used as a low-resolution-ratio reference image in training dataset 250, and a high-resolution-ratio image of the frame can be used as a high-resolution-ratio reference image in training dataset 250. As another example, the image rendered at the cloud server may be a low-resolution-ratio image (used as a low-resolution-ratio reference image in training dataset 250) and a high-resolution-ratio image (used as a high-resolution-ratio reference image in training dataset 250) obtained by the game engine of the cloud server through rendering according to the game data. As another example, the image received from the terminal device may be a game image of the terminal device.

It should also be understood that, due to the particularity of cloud games, for the same scene of the same game, the game images rendered by the game engine and sent to different users may be identical. Therefore, only corresponding image data of the same game can be used as training dataset 250. By using such manner, the model training process can be simplified, and the model performance can be optimized.

Figure 4:
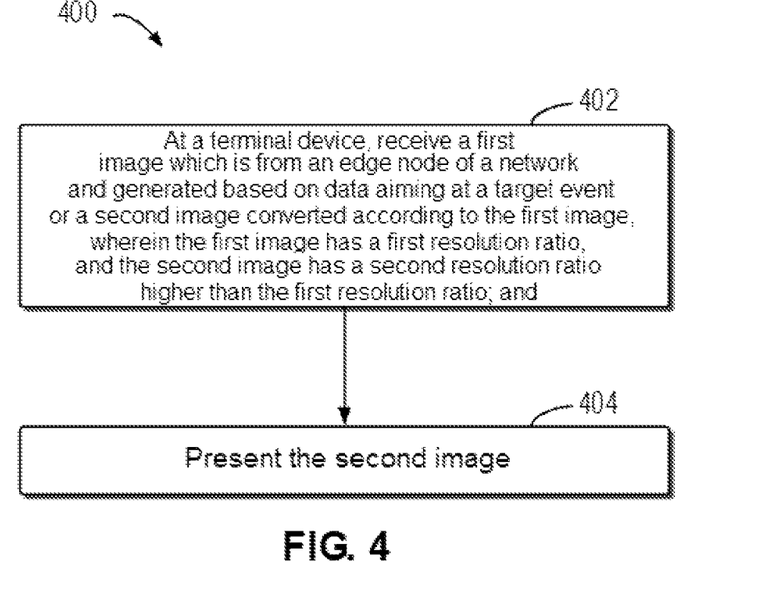
FIG. 4 illustrates a flow chart of a process for image processing on a terminal device side according to embodiments of the present disclosure.

FIG. 4 illustrates a flow chart of process 400 for image processing on a terminal device side according to embodiments of the present disclosure. In some embodiments, process 400 may be implemented in terminal device 130 in FIG. 1. Process 400 for image processing according to the embodiments of the present disclosure will now be described with reference to FIG. 4 in combination with FIG. 1. For ease of understanding, specific examples mentioned in the following description are all illustrative and are not used to limit the protection scope of the present disclosure.

At 402, terminal device 130 may receive a first image which is from an edge node of a network and generated based on data associated with a target event or a second image converted according to the first image. In some embodiments, the first image has a low first resolution ratio, for example, 540p. The second image has a second resolution ratio higher than the first resolution ratio, for example, 4K. It should be understood that the target event may be an entertainment interaction event (such as games, particularly cloud games), an online education event (such as a remote classroom), and an online conference event. Additionally, the first image received by terminal device 130 may be generated in engine module 111 of cloud server 110 through rendering based on game data. Optionally or additionally, the first image received by terminal device 130 may also be rendered by a game engine disposed in edge node 120.

At 404, terminal device 130 may present the second image to a user. In such manner, the data volume of game data to be rendered and transmitted by the cloud server is reduced, thereby reducing the time delay for the game data to be transmitted to terminal device 130 of the user. Additionally, again assuming by way of example that 1 G of bandwidth is needed for transmitting a conventional image directly rendered by cloud server 110 and having a first resolution ratio such as 4K, a substantially reduced amount of bandwidth, such as only 100 M of bandwidth, is needed for transmitting an image rendered by engine module 111 of cloud server 110 of the present disclosure and having a second resolution ratio such as 540p. Therefore, the bandwidth for image transmission is significantly reduced.

In some embodiments, if terminal device 130 is a computing device having sufficient graphics operation and processing capability, an image processing model obtained through training by model training module 112 in cloud server 110 can be loaded to terminal device 130. At this point, terminal device 130 can convert a received first image into a second image. As an example, terminal device 130 can input the first image into a trained image processing model to obtain the second image.

In some embodiments, the image processing model received from cloud server 110 in the network is trained based on training dataset 250. For example, model training module 112 uses low-resolution-ratio reference images as the input to the image processing model and uses corresponding high-resolution-ratio reference images as the output from the image processing model to iteratively train the image processing model until parameters of the image processing model converge or until a preset number of iterations is reached. By using such manner, the bandwidth and time delay of transmission of high-definition images can be significantly reduced, so that the user experience is improved.

In some embodiments, the low-resolution-ratio reference images and corresponding high-resolution-ratio reference images used as training dataset 250 are obtained from at least one of the following: a frame in a video obtained from the server; an image rendered at the server; and an image received from the terminal device. As an example, the frame in the video obtained from the server may be a frame in a game video obtained from a video content platform such as YouTube. For example, a frame in a game video may be obtained, a low-resolution-ratio image of the frame can be used as a low-resolution-ratio reference image in training dataset 250, and a high-resolution-ratio image of the frame can be used as a high-resolution-ratio reference image in training dataset 250. As another example, the image rendered at the cloud server may be a low-resolution-ratio image (used as a low-resolution-ratio reference image in training dataset 250) and a high-resolution-ratio image (used as a high-resolution-ratio reference image in training dataset 250) obtained by the game engine of the cloud server through rendering according to the game data. As another example, the image received from the terminal device may be a game image of the terminal device.

The processes for image processing of the present disclosure are respectively described above in detail on the edge node side and the terminal device side. In order to more systemically describe the embodiments of the present disclosure, example processes of reconstructing a high-resolution-ratio image will be respectively described hereafter with reference to FIG. 5 and FIG. 6.

Figure 5:
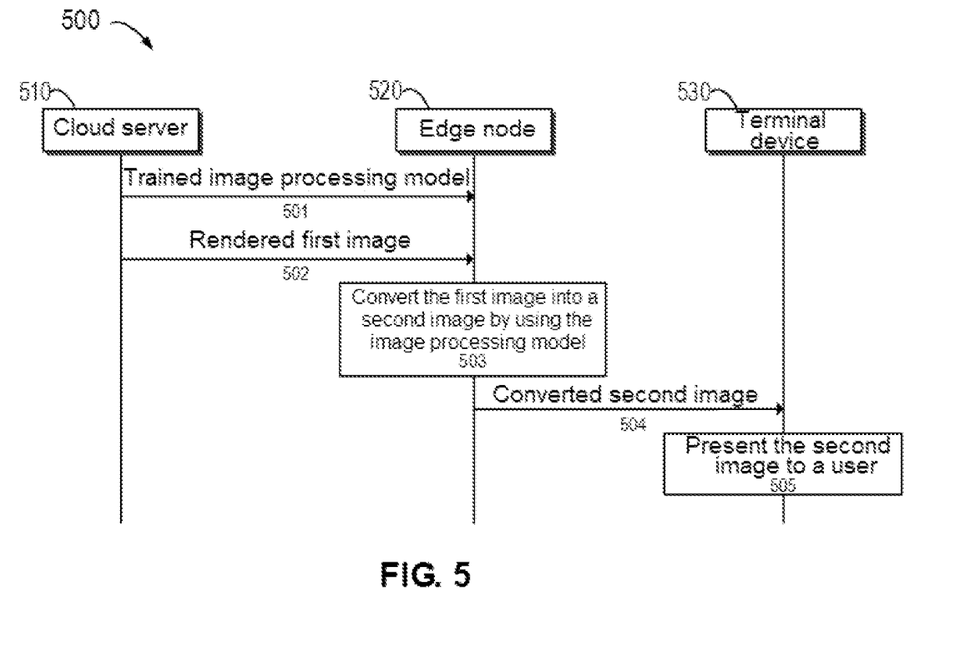
FIG. 5 illustrates a pipeline diagram of a first example process for image processing according to embodiments of the present disclosure.

FIG. 5 illustrates a pipeline diagram of first example process 500 for image processing according to embodiments of the present disclosure. After trained image processing model 501 issued by cloud server 510 is received, edge node 520 may install the model locally. In response to receiving first image 502 rendered by cloud server 510, edge node 520 initiates transaction 503 to convert the received first image into a second image using an image processing model. The first image and the second image present the same image (using the game image), and a resolution ratio of the second image is higher than a resolution ratio of the first image, so that the reconstruction of a high-resolution-ratio image is achieved. Then, edge node 520 sends converted second image 504 to terminal device 530 so as to transmit a reconstructed high-definition image to a user side. The second image is presented to a user of terminal device 530 as indicated at 505. Through the above operations, since cloud server 510 undertakes the task of training the image processing model and edge node 520 undertakes the task of applying the image processing model, in the present embodiment, the hardware requirements for terminal device 530 can be reduced while the bandwidth and time delay of data transmission are reduced.

Figure 6:
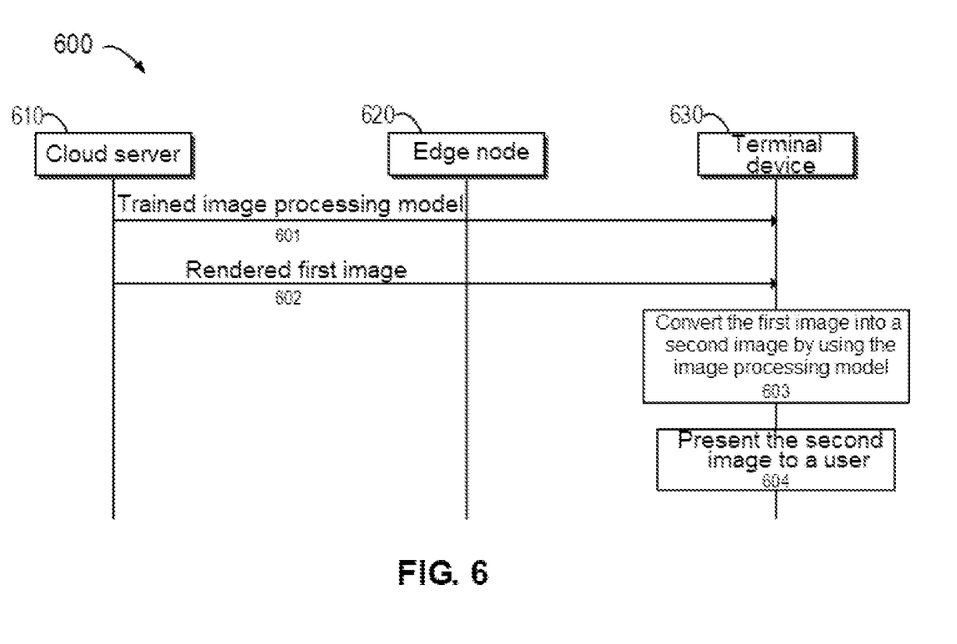
FIG. 6 illustrates a pipeline diagram of a second example process for image processing according to embodiments of the present disclosure.

FIG. 6 illustrates a pipeline diagram of second example process 600 for image processing according to embodiments of the present disclosure. After trained image processing model 601 issued by cloud server 610 (optionally, forwarded by edge node 620) is received, terminal device 630 may install the model locally. In response to receiving first image 602 rendered by cloud server 610 (optionally, forwarded by edge node 620), terminal device 630 initiates transaction 603 to convert the received first image into a second image using an image processing model. The first image and the second image present the same image (using the game image), and a resolution ratio of the second image is higher than a resolution ratio of the first image, so that the reconstruction of a high-resolution-ratio image is achieved. Then, terminal device 630 initiates transaction 604 to present the reconstructed second image to the user. Through the above operations, since cloud server 610 undertakes the task of training the image processing model and the data volume of transmitted low-resolution-ratio images is significantly reduced, the bandwidth and time delay of data transmission can be reduced significantly in the present embodiment.

According to the above embodiments, in the present disclosure, by rendering low-resolution-ratio images at a cloud server and transmitting the images to an edge node or a terminal device for reconstructing high-resolution-ratio images, the bandwidth and time delay of transmission of high-definition images are significantly reduced, so that the user experience is improved. Further, by achieving the reconstruction of high-resolution-ratio images by using the edge node, the hardware requirements of the user for the terminal device can be reduced while reducing the bandwidth and time delay of transmission of the high-definition images, so that the user can obtain the game experience with high-definition image quality only by using a hardware device with a basic video decoding function. Additionally, in the present disclosure, by training the image processing model for reconstructing high-resolution images on the cloud server, the hardware requirements for the edge node and the terminal device are reduced.

Figure 7:
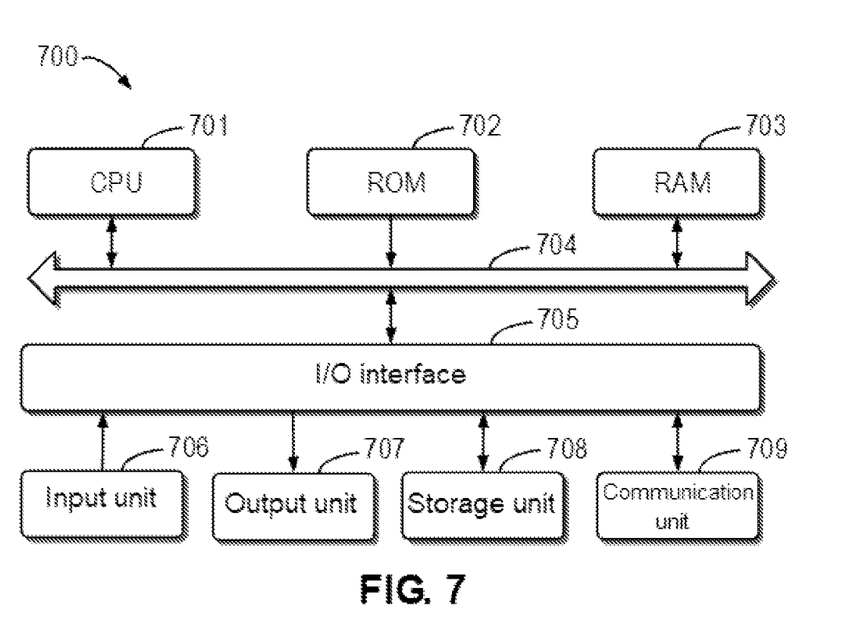
FIG. 7 illustrates a block diagram of a computing device that can be configured to implement a plurality of embodiments of the present disclosure.

FIG. 7 illustrates a block diagram of a computing device 700 that can be configured to implement a plurality of embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing devices, cellular telephones, smartphones, wearable devices, and other similar computing devices. Components shown herein, their connections and relationships, and their functions are only used as examples and are not intended to limit the implementations of the present disclosure described and/or claimed herein.

As shown in FIG. 7, device 700 includes a computing unit 701, illustratively implemented as a central processing unit (CPU), that may perform various appropriate actions and processing according to a computer program stored in read-only memory (ROM) 702 or a computer program loaded from storage unit 708 to random access memory (RAM) 703. Various programs and data required for the operation of device 700 may also be stored in RAM 703. Computing unit 701, ROM 702, and RAM 703 are connected to each other via bus 704. Input/output (I/O) interface 705 is also connected to bus 704.

A plurality of components in device 700 are connected to I/O interface 705, including: input unit 706, such as a keyboard and a mouse; output unit 707, such as various types of displays and loudspeakers; storage unit 708, such as a magnetic disk and an optical disk; and communication unit 709, such as a network card, a modem, and a wireless communication transceiver. Communication unit 709 allows device 700 to exchange information/data with other devices via a computer network, such as the Internet, and/or various telecommunication networks.

Computing unit 701 may be various general-purpose and/or special-purpose processing components with processing and computing capabilities. Some examples of computing unit 701 include, but are not limited to, the above-noted CPU, a graphics processing unit (GPU), various special-purpose artificial intelligence (AI) computing chips, various computing units running machine learning model algorithms, a digital signal processor (DSP), and any suitable processors, controllers, micro-controllers, etc. Computing unit 701 performs the various methods and processing described above, such as processes 300 and 400. For example, in some embodiments, processes 300 and 400 may be implemented as a computer software program that is tangibly included in a machine-readable medium, for example, storage unit 708. In some embodiments, part or all of the computer program may be loaded and/or installed to device 700 via ROM 702 and/or communication unit 709. When the computer program is loaded to RAM 703 and executed by computing unit 701, one or more steps of processes 300 and 400 described above may be performed. Alternatively, in other embodiments, computing unit 701 may also be configured to implement processes 300 and 400 in any other suitable manners (such as by means of firmware).

Various implementations of the systems and techniques described herein above may be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or combinations thereof. These implementations may include: the implementations are performed in one or more computer programs which can be executed and/or interpreted on a programmable system including at least one programmable processor, and the programmable processor can be a special-purpose or general-purpose programmable processor, which can receive data and instructions from a storage system, at least one input device, and at least one output device, and transmit the data and instructions to the storage system, the at least one input device, and the at least one output device.

Program code for implementing the method of the present disclosure may be written by using one programming language or any combination of a plurality of programming languages. The program code may be provided to a processor or controller of a general-purpose computer, a special-purpose computer, or other programmable data processing devices. Therefore, when the program code is executed by the processor or the controller, the functions/operations specified in the flow chart and/or the block diagram are implemented. The program code can be completely executed on a machine, partially executed on a machine, partially executed on a machine as an independent software package and partially executed on a remote machine, or completely executed on a remote machine or a server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combinations thereof. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

In order to provide interaction with a user, the systems and techniques described herein may be implemented on a computer. The computer includes: a display device (for example, a cathode ray tube (CRT) or liquid crystal display (LCD) monitor) for displaying information to a user; and a keyboard and a pointing device (for example, a mouse or a trackball) through which a user can provide input to the computer. Other types of devices may also be used to provide interaction with a user. For example, feedback provided to the user may be any form of sensory feedback (for example, visual feedback, auditory feedback, or tactile feedback); and additionally, input from the user may be received in any form (including acoustic input, voice input, or tactile input).

The systems and techniques described herein may be implemented in a computing system including a back-end component (for example, as a data server), or a computing system including a middleware component (for example, an application server), or a computing system including a front-end component (for example, a user computer having a graphical user interface or a web browser through which a user may interact with the implementations of the systems and techniques described herein), or a computing system including any combination of the back-end component, the middleware component, or the front-end component. The components of the system may be mutually connected through digital data communication (for example, a communication network) through any form or medium. An example of the communication network includes: a local area network (LAN), a wide area network (WAN), and the Internet.

The computer system may include a client terminal and a server. The client terminal and the server are generally disposed far away from each other and generally interact with each other through a communication network. A relationship between the client terminal and the server is generated by computer programs that run on corresponding computers and have a client terminal-server relationship with each other.

It should be understood that the various forms of processes shown above may be used to reorder, add, or remove steps. For example, the steps recorded in the present disclosure may be performed in parallel, may be performed sequentially, or may be performed in different orders as long as the desired results of the technical solution disclosed by the present disclosure are achieved, and there is no restriction herein.

The above specific implementations do not constitute a limitation to the protection scope of the present disclosure. It will be apparent to those skilled in the art that various modifications, combinations, sub-combinations, and substitutions may be performed according to design requirements and other factors. Any modifications, equivalent substitutions, improvements, and the like made within the spirit and principles of the present disclosure shall be included within the protection scope of the present disclosure.

What is claimed is:

1. A method for image processing, comprising:
    at an edge node of a network, obtaining a first image generated based on data associated with a target event, wherein the first image has a first resolution ratio; and
    sending a second image converted from the first image to a terminal device, wherein the second image has a second resolution ratio higher than the first resolution ratio;
    wherein the second image is converted from the first image utilizing a trained image processing model that is trained in a cloud server of the network, the cloud server being separate from the edge node, the trained image processing model being provided from the cloud server to the edge node for installation in the edge node;
    wherein the trained image processing model is trained in the cloud server utilizing a training dataset that comprises images from each of (i) at least one video obtained by the cloud server for a specific type of video game from at least one video content platform external to the cloud server, and (ii) at least one video obtained by the cloud server from execution of the specific type of video game in a gaming engine of the cloud server, the training dataset further comprising one or more images obtained by the cloud server from the terminal device from execution of the specific type of video game at the terminal device;
    wherein the first image is provided from the cloud server to the edge node as a rendered first image generated by the cloud server at the first resolution ratio utilizing the gaming engine of the cloud server; and
    wherein the converted second image is provided from the edge node to the terminal device at the second resolution ratio higher than the first resolution ratio for presentation by the terminal device at the second resolution ratio.

2. The method according to claim 1, further comprising: converting the first image into the second image based on the trained image processing model.

3. The method according to claim 2, further comprising: receiving the image processing model from the cloud server of the network, wherein the image processing model is obtained through training by using low-resolution-ratio reference images as inputs and corresponding high-resolution-ratio reference images as outputs.

4. The method according to claim 3, wherein the low-resolution-ratio reference images and the corresponding high-resolution-ratio reference images are obtained from at least one of the following:
    a frame in a video obtained by the cloud server;
    an image rendered at the cloud server; and
    an image received from the terminal device.

5. The method according to claim 1, wherein the edge node obtains a third image generated based on additional data associated with the target event, the third image having a third resolution ratio, and sends the third image to the terminal device, and wherein the terminal device converts the received third image into a fourth image, the fourth image having a fourth resolution ratio higher than the third resolution ratio.

6. The method according to claim 1, wherein the target event comprises at least one of the following: an entertainment interaction event, an online education event, and an online conference event.

7. A computer program product tangibly stored on a non-transitory computer-readable medium and comprising machine-executable instructions, wherein the machine-executable instructions, when executed, cause a machine to perform the method according to claim 1.

8. The method according to claim 1, wherein the trained image processing model is fully trained in the cloud server, prior to being provided from the cloud server to the edge node for installation therein, and is not further trained in the edge node.

9. A method for image processing, comprising:
at a terminal device, receiving a first image which is from an edge node of a network and generated based on data associated with a target event, wherein the first image has a first resolution ratio;
converting the first image at the terminal device into a second image, the second image having a second resolution ratio higher than the first resolution ratio; and
presenting the second image at the terminal device;
wherein the second image is converted from the first image utilizing a trained image processing model that is trained in a cloud server of the network, the cloud server being separate from the edge node, the trained image processing model being provided from the cloud server to the terminal device for installation in the terminal device;
wherein the trained image processing model is trained in the cloud server utilizing a training dataset that comprises images from each of (i) at least one video obtained by the cloud server for a specific type of video game from at least one video content platform external to the cloud server, and (ii) at least one video obtained by the cloud server from execution of the specific type of video game in a gaming engine of the cloud server, the training dataset further comprising one or more images obtained by the cloud server from the terminal device from execution of the specific type of video game at the terminal device;
wherein the first image is provided from the cloud server to the terminal device via the edge node as a rendered first image generated by the cloud server at the first resolution ratio utilizing the gaming engine of the cloud server; and
wherein the converted second image is generated in the terminal device at the second resolution ratio higher than the first resolution ratio, for presentation by the terminal device at the second resolution ratio.

10. The method according to claim 9, wherein converting the first image into the second image comprises:
inputting the first image into the trained image processing model so as to obtain the second image.

11. The method according to claim 10, further comprising:
receiving the image processing model from the cloud server of the network, wherein the image processing model is obtained through training by using low-resolution-ratio reference images as inputs and corresponding high-resolution-ratio reference images as outputs.

12. The method according to claim 11, wherein the low-resolution-ratio reference images and the corresponding high-resolution-ratio reference images are obtained from at least one of the following:
a frame in a video obtained by the cloud server;
an image rendered at the cloud server; and
an image received from the terminal device.

13. The method according to claim 9, wherein the target event comprises at least one of the following: an entertainment interaction event, an online education event, and an online conference event.

14. A computer program product tangibly stored on a non-transitory computer-readable medium and comprising machine-executable instructions, wherein the machine-executable instructions, when executed, cause a machine to perform the method according to claim 7.

15. An electronic device, comprising:
at least one processor; and
a memory coupled to the at least one processor and having instructions stored therein, wherein the instructions, when executed by the at least one processor, cause the electronic device to perform actions comprising:
at an edge node of a network, obtaining a first image generated based on data associated with a target event, wherein the first image has a first resolution ratio; and
sending a second image converted from the first image to a terminal device, wherein the second image has a second resolution ratio higher than the first resolution ratio;
wherein the second image is converted from the first image utilizing a trained image processing model that is trained in a cloud server of the network, the cloud server being separate from the edge node, the trained image processing model being provided from the cloud server to the edge node for installation in the edge node;
wherein the trained image processing model is trained in the cloud server utilizing a training dataset that comprises images from each of (i) at least one video obtained by the cloud server for a specific type of video game from at least one video content platform external to the cloud server, and (ii) at least one video obtained by the cloud server from execution of the specific type of video game in a gaming engine of the cloud server, the training dataset further comprising one or more images obtained by the cloud server from the terminal device from execution of the specific type of video game at the terminal device;
wherein the first image is provided from the cloud server to the edge node as a rendered first image generated by the cloud server at the first resolution ratio utilizing the gaming engine of the cloud server; and
wherein the converted second image is provided from the edge node to the terminal device at the second resolution ratio higher than the first resolution ratio for presentation by the terminal device at the second resolution ratio.

16. The electronic device according to claim 15, wherein the actions further comprise:
converting the first image into the second image based on the trained image processing model.

17. The electronic device according to claim 16, wherein the actions further comprise:
receiving the image processing model from the cloud server of the network, wherein the image processing model is obtained through training by using low-resolution-ratio reference images as inputs and corresponding high-resolution-ratio reference images as outputs.

18. The electronic device according to claim 17, wherein the low-resolution-ratio reference images and the corresponding high-resolution-ratio reference images are obtained from at least one of the following:
a frame in a video obtained by the cloud server;
an image rendered at the cloud server; and
an image received from the terminal device.

19. The electronic device according to claim 15, wherein the edge node obtains a third image generated based on additional data associated with the target event, the third image having a third resolution ratio, and sends the third image to the terminal device, and wherein the terminal device converts the received third image into a fourth image, the fourth image having a fourth resolution ratio higher than the third resolution ratio.

20. The electronic device according to claim 15, wherein the target event comprises at least one of the following: an entertainment interaction event, an online education event, and an online conference event.

\* \* \* \* \*

UNITED STATES PATENT AND TRADEMARK OFFICE
CERTIFICATE OF CORRECTION

PATENT NO. : 12,141,942 B2
APPLICATION NO. : 17/400382
DATED : November 12, 2024
INVENTOR(S) : Pedro Fernandez Orellana et al.

It is certified that error appears in the above-identified patent and that said Letters Patent is hereby corrected as shown below:

In the Claims

Claim 14, Column 13, Line 67, please delete "method according to claim 7" and insert therefor --method according to claim 9--

Signed and Sealed this
Tenth Day of December, 2024

Katherine Kelly Vidal
*Director of the United States Patent and Trademark Office*